G. C. MORGAN.
PIPE-COUPLING.

No. 180,781. Patented Aug. 8, 1876.

Witnesses:
O. W. Bond
E. A. West

Inventor:
George C. Morgan

UNITED STATES PATENT OFFICE.

GEORGE C. MORGAN, OF CHICAGO, ILLINOIS.

IMPROVEMENT IN PIPE-COUPLINGS.

Specification forming part of Letters Patent No. 180,781, dated August 8, 1876; application filed June 29, 1876.

*To all whom it may concern:*

Be it known that I, GEORGE C. MORGAN, of the city of Chicago, Cook county, State of Illinois, have invented a new and useful Improvement in Pipe-Couplings, of which the following is a full description, reference being had to the accompanying drawings, in which—

Figure 1:
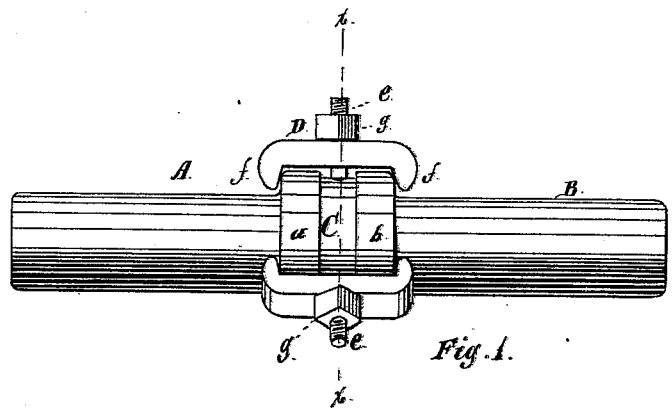
Figure 2:
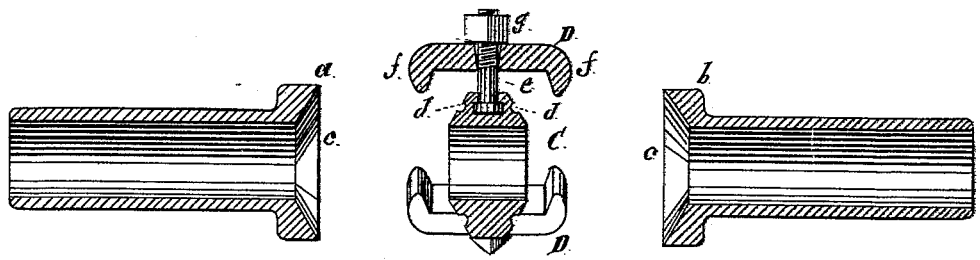
Figure 3:
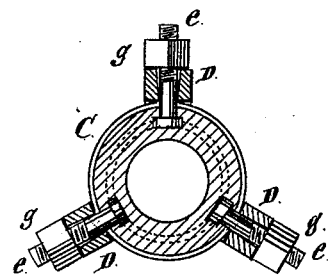

Figure 1 is an elevation; Fig. 2, a longitudinal vertical section of the parts separated; Fig. 3, a cross-section on line $x$ of Fig. 1.

This invention is chiefly designed to be used for coupling water and gas pipes, the object being to provide a safer and better coupling than any now in use for such purpose, which I accomplish by means of a coupling-piece fitting into the enlarged ends of the pipes, such coupling-piece being provided with suitable bolts, and the ends of the pipes and coupling-piece being drawn tightly together and held in place by means of clamping bars and nuts, as more fully hereinafter described.

In the drawings, A B represent parts of two sections or joints of pipe, the ends of which are provided with flanges $a$ $b$. The passage through the pipes does not extend directly through these flanges, but is enlarged at the ends, as represented at $c$, Fig. 2. C is a coupling-piece, having an opening through it corresponding in size with the opening through the pipes. The faces of this coupling-piece correspond in form with the enlargements in the ends of the pipes A B, so that such coupling can be inserted into the ends of the pipes A B. $d$ are grooves in the faces of the coupling-piece C. $e$ are screw-threaded bolts, the heads of which are secured in the connecting-piece C, which can most conveniently be done by casting the metal around them. D are clamping-bars, the ends $f$ of which are beveled upon the inside. These clamping-bars D are provided with holes to receive the bolts $e$, which holes are beveled a little—larger upon the outside than upon the inside—to permit a little play of the bars D upon the bolts $e$. $g$ are nuts.

I use oakum or any other suitable packing between the faces of the coupling-piece C and the ends of the pipes A B, and thus am able to wholly dispense with the expensive lead packing now in use, which lead packing is unsafe for large pipes.

In use, the three parts A B C are brought together, as represented in Fig. 1. The couplings D are then placed upon the bolts $e$, and the nuts $g$ are applied, by means of which devices the pipes and coupling-piece C can be brought securely together, forming a safe joint, and one which can be easily put together in any position. The clamping-bars D are to be of such length that the beveled faces upon the insides of the ends $f$ will come in contact with the flanges $a$ $b$, as shown in Fig. 1. Grooves corresponding with the grooves $d$ may be made in the ends of the pipes. It is not absolutely necessary that any grooves be used, though I prefer to have them in the connecting-piece, or in the flanges, or both. Pipes coupled as described can be easily disconnected for repairs.

It is not necessary that the coupling or center piece should in all cases be made of metal. For some purposes or uses, as for hose-couplings, it may be made of rubber, or of rope or leather, or other suitable material, with the bolts $e$ cast in or inserted from the inside.

I have shown three clamping-bars and bolts; but a greater number may be used, and will be required for large mains.

What I claim as new, and desire to secure by Letters Patent, is as follows:

The connecting-piece C, bolts $e$, and clamping-bars D, in combination with the pipes A B, substantially as specified.

GEORGE C. MORGAN.

Witnesses:
E. A. WEST,
O. W. BOND.